UNITED STATES PATENT OFFICE.

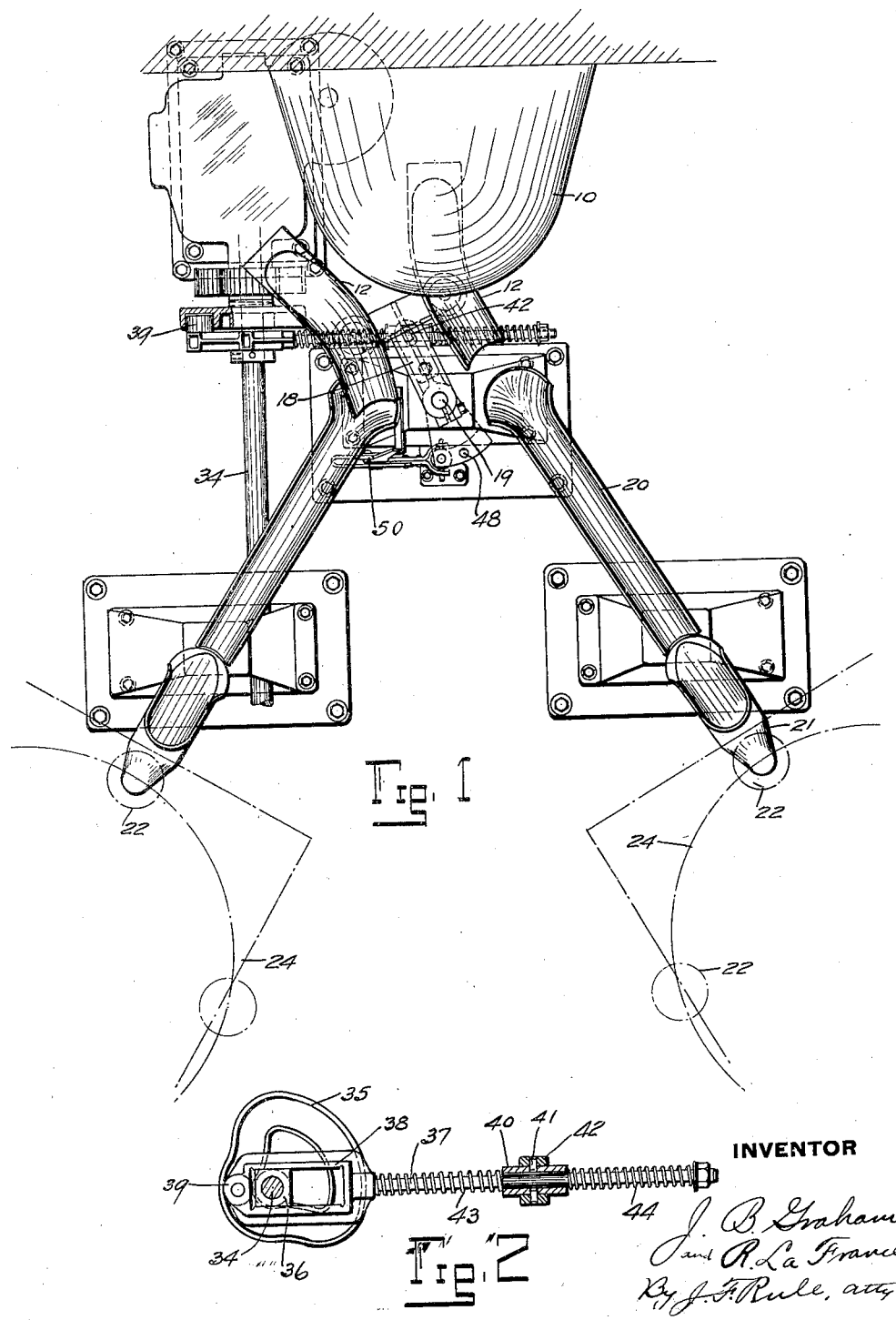

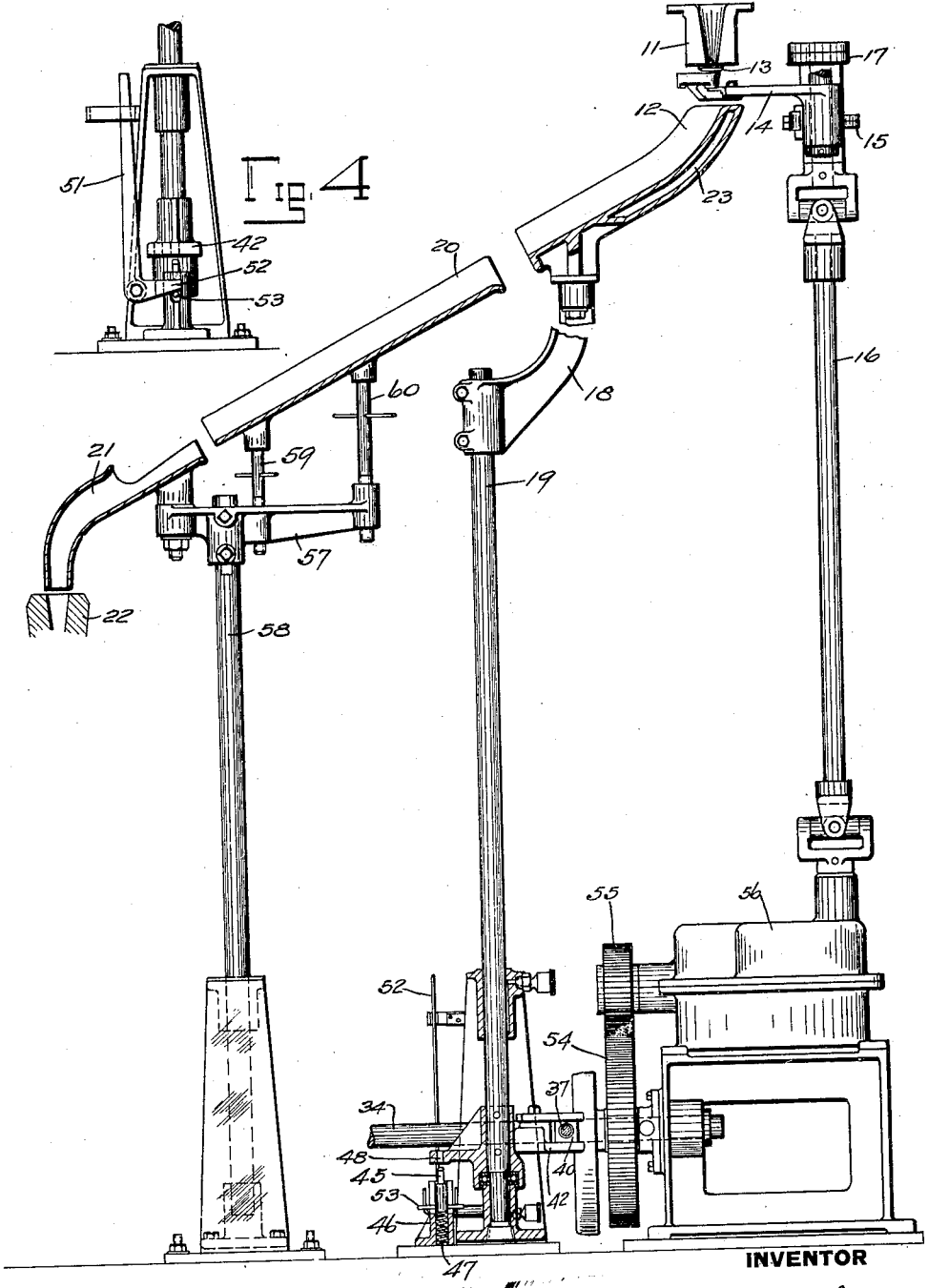

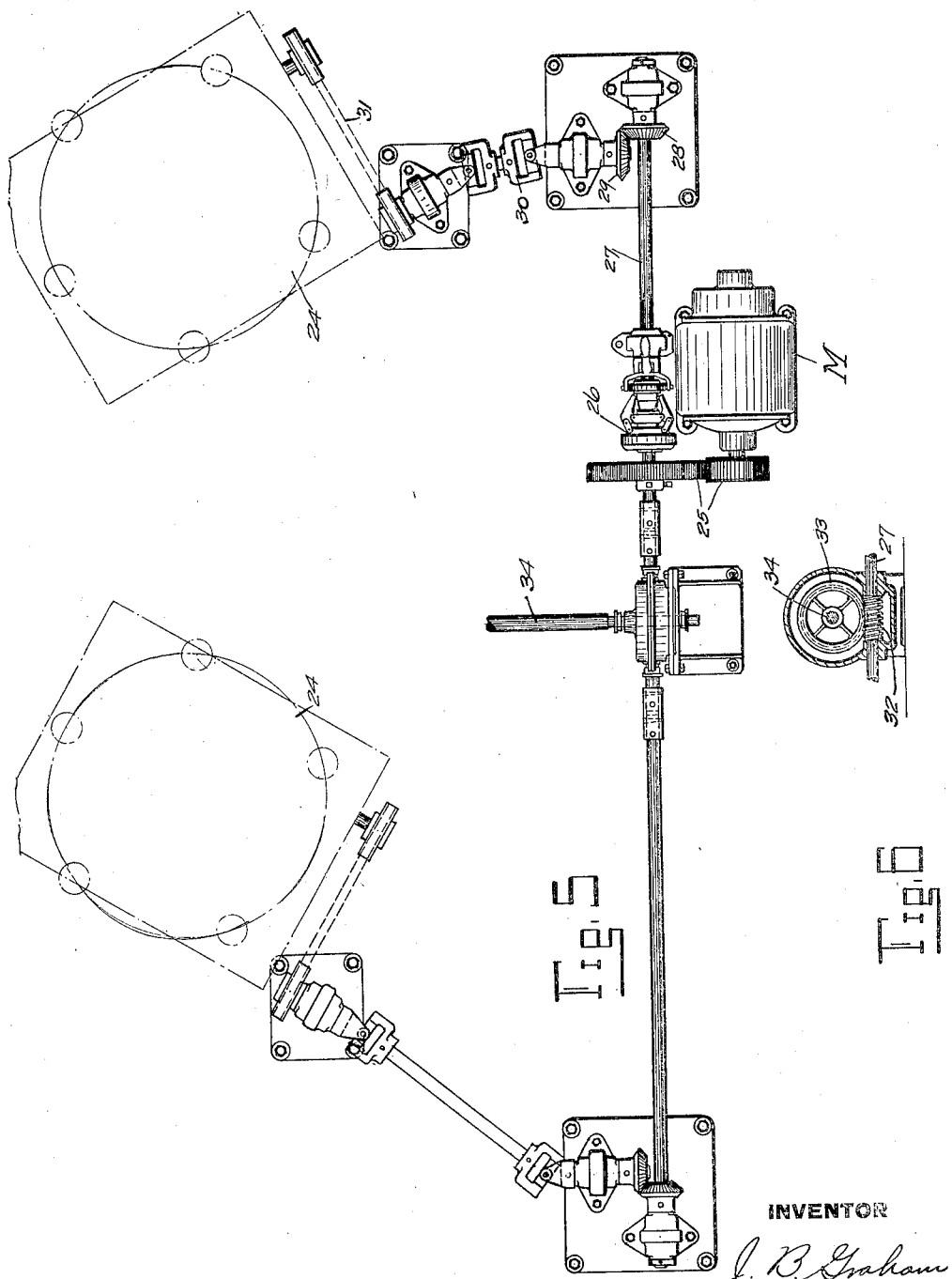

JOSEPH B. GRAHAM, OF EVANSVILLE, INDIANA, AND RICHARD LA FRANCE, OF TOLEDO, OHIO, ASSIGNORS TO THE OWENS BOTTLE MACHINE COMPANY, OF TOLEDO, OHIO, A CORPORATION OF OHIO.

APPARATUS FOR CONVEYING MOLTEN GLASS.

1,350,448.   Specification of Letters Patent.   Patented Aug. 24, 1920.

Application filed April 17, 1918.   Serial No. 229,010.

*To all whom it may concern:*

Be it known that we, JOSEPH B. GRAHAM, a citizen of the United States, residing at Evansville, in the county of Vanderburg and State of Indiana, and RICHARD LA FRANCE, a citizen of the United States, residing at Toledo, in the county of Lucas and State of Ohio, have invented new and useful Improvements in Apparatus for Conveying Molten Glass, of which the following is a specification.

Our invention relates to apparatus particularly designed for transferring gobs or charges of molten glass from the gob forming apparatus to molds on a pressing or blowing machine.

It is old in the art to supply glass in a continuous stream from a melting furnace and segregate the stream into individual masses or charges which are dropped directly into forming molds or otherwise transferred to the molds. The latter are usually arranged on a rotary mold table of a glass forming machine, so that the molds are brought successively into position to receive the charges.

An object of the present invention is to provide an improved form of apparatus by which a single stream of glass may supply a plurality of forming machines, the successive charges being directed alternately to the molds of the two machines. In its preferred form a pair of troughs or chutes are connected together and mounted to oscillate about a vertical axis to bring the chutes alternately into position to receive a charge or gob of glass. Each trough delivers its charge to a stationary trough or chute along which the glass is conveyed to the forming molds, there being one of said stationary chutes for each machine. The oscillating troughs together form a switch by which the gobs of glass are directed, and said switch is geared to be operated in timed relation to the gob forming apparatus and also to the rotary movements of the mold tables. A locking device is provided to hold the switch in neutral position whenever it is desired to stop the supply of glass to the machines. The gobs or stream of glass (when the gob forming apparatus is stopped) can then fall between the spaced chutes without coming in contact therewith.

Other features of the invention and the exact nature thereof will appear more fully hereinafter.

In the accompanying drawings:

Figure 1 is a plan view of the apparatus.

Fig. 2 is a part sectional elevation of the cam and connections for oscillating the switch.

Fig. 3 is a part sectional side elevation of the apparatus.

Fig. 4 is a detail elevation showing a locking device to hold the switch in neutral position.

Fig. 5 is a plan view showing the train of gears between the forming machines and the transfer apparatus.

Fig. 6 is a detail showing a worm drive.

The glass may be supplied in a continuous stream through a flow opening in the bottom of a boot or extension 10 of a continuous melting furnace. The glass flows into a sectional cup 11 directly beneath the flow opening, and when enough has accumulated in the cup to form a charge or gob, the cup sections are separated, permitting the gob to drop onto a chute 12 directly beneath the cup. The cup sections are then brought together and a knife 13 swings across the open bottom of the cup to sever the discharged gob from the oncoming stream. The knife 13 is carried on a rock arm 14 actuated by a cam 15 on a continuously rotating vertical drive shaft 16. The latter also carries a cam 17 operable through suitable connections to open and close the cup 11. The gob forming mechanism in itself forms no part of the present invention. The construction and operation of such mechanism may be the same as set forth in my co-pending application, Serial Number 174,697, filed June 14, 1917. Other forms of apparatus may be used for supplying the charges of glass to the transfer mechanism.

The pair of troughs or chutes 12 are carried on a rock arm or bracket 18 bolted to a vertical rock shaft 19 and adjustable up and down thereon. The shaft 19 is oscillated (by mechanism hereinafter described) to bring the chutes 12 alternately into operative position with the upper end of the chute directly beneath the cup 11. The gob of glass when dropped on a chute 12 moves rapidly down the chute and onto a stationary trough or chute 20 in alinement therewith. The plane of the chute 12 may be somewhat higher than that of the chute 20 to compensate for the slight drop due to gravity as the gob jumps from one chute to the next. At the lower end of the chute 20 is a funnel or guide 21 through which the gob is directed into a mold 22 directly beneath the mouth of the funnel. The section 21 is also slightly stepped below the trough 20. The upper end of the trough 12 is curved upward so that it is nearly vertical at the point where the gob of glass strikes it when dropped from the cup 11. The gob, therefore, strikes the trough with a light, glancing blow so that its rapid downward movement is not retarded, and the gob of soft glass is not flattened out as it would be by striking the trough squarely. The gob slides rapidly down the sectional chute comprising the sections 12, 20 and 21. The section 12, as shown, is provided with a compartment 23 in which a cooling liquid may be circulated if found necessary or desirable. Ordinarily, however, the glass is in contact with the chute for such a brief interval that the heating of the conveying surface is not excessive. The use of two chutes which are only brought in contact with alternate gobs of glass, further reduces the heating effect. On the other hand, it may be an advantage at times to provide means for heating the trough to thereby prevent chilling of the gob.

The machines 24 on which the glass articles are formed, are each provided with molds 22 arranged in a circle on the mold table. The mold table may be rotated step by step to bring the molds 22 successively into receiving position beneath the chute 21. The forming machines 24, the gob forming apparatus and the transfer mechanism are all driven from a continuously running motor M (Fig. 5). The motor is connected through gears 25 to a sectional drive shaft 27. A clutch 26 is provided between the motor and the shaft, so that the machines may be stopped independently of the motor. The power is transmitted from the shaft 27 through bevel gears 28 and 29, a flexible shaft 30 and drive 31 to the mechanism for driving the machine 24. A similar train of gearing is provided between the shaft 27 and each machine 24.

An intermediate section of the shaft 27 is provided with a worm 32 which drives a worm gear 33 on a shaft 34, to which is fixed a cam 35. This cam operates through the following mechanism to rock the shaft 19 for oscillating the chutes 12. Mounted on the shaft 34 is a squared bearing block 36 for guiding a reciprocating rod 37, the latter formed with a guideway 38 for the block 36. A wrist 39 on the rod 37 runs in the cam groove so that the rod 37 is reciprocated as the cam rotates with the shaft 34. At an intermediate position on the rod 37 is a sleeve 40 slidable on the rod. A driving connection between the rod 37 and a rock arm or bracket 42 on the shaft 19 is provided by a pin 41 carried by the sleeve 40 and engaging an elongated slot in the arm 42. The sleeve 40 is held in its normal position on the rod by coil springs 43 and 44. In the normal operation, the sleeve 40 moves with the rod 37, but it may be locked in a stationary position, for the purpose which will presently appear, without interfering with the reciprocating movement of the rod.

When for any reason it is desired to temporarily stop the feeding of glass to the machines the switch may be locked in an intermediate position without stopping the driving mechanism, thereby allowing the glass to be discharged between the troughs 12. This locking mechanism comprises a locking bolt 45 guided in a vertical socket 46 and moved to locking position by a coil spring 47. The locking bolt when moved upwardly is adapted to enter a socket 48 in the bracket 42. The locking bolt is normally held down by a bell crank lever 51 having an arm 52 extending over a pin 53 projecting from the locking bolt. The lever 51 may engage behind a shoulder 50 (Fig. 1) to hold the locking bolt retracted. When the lever is released the locking bolt moves upward against the under face of the bracket 42 and as soon as said bracket reaches a central position so that the opening 48 is brought in register with the locking bolt, the latter snaps into said opening and locks the bracket, thereby locking the rock shaft 19 and holding the switch in its intermediate position. While the cam shaft continues to rotate, the rod 37 slides in the sleeve 40, thereby alternately compressing the springs 43 and 44.

Motion is transmitted from the cam shaft 34 through gears 54 and 55 and gearing within a casing 56 to the drive shaft 16 for actuating the gob forming mechanism. The apparatus, including the forming machines, gob forming mechanism and transfer mechanism, is arranged and timed to operate the several elements in their proper order of sequence and in timed relation to secure the desired results. The gob forming apparatus is so timed with respect to the movement of the mold tables that each gob is discharged into a mold while the latter is stationary at the receiving position. The cam 35 is so formed that the switch may be held stationary with either trough 12 in receiving position while a charge of glass is being transmitted along said trough. The several sections 12, 20 and 21 are individually and relatively adjustable vertically to suit varying conditions. The sections 20 and 21 are carried on a bracket 57, vertically adjustable on a standard 58. Adjusting rods 59, 60, screw threaded into the bracket 57, permit adjustment of the section 20 relative to the other sections.

Modifications may be resorted to within the spirit and scope of our invention.

What we claim is:

1. The combination with means for discharging molten glass, of a switch device comprising a plurality of means for receiving and directing the glass to different positions, said receiving and directing means being brought individually into operative position by the movement of the switch, the latter having an intermediate position permitting the glass to be discharged independently of said receiving and directing means.

2. The combination with means for discharging molten glass, of a switch device comprising a plurality of means for receiving and directing the glass to different positions, said receiving and directing means being brought individually into operative position by the movement of the switch, automatic means for actuating the switch, and a locking device for holding the switch in a neutral position, intermediate said operative position, permitting the glass to be discharged independently of the switch.

3. The combination with means for supplying molten glass, of a switch device shiftable to different operative positions to receive the glass and direct it to corresponding positions, an actuator for said switch device, a lock to hold said device in a neutral position out of the path of glass from said supplying means, and a yielding connection between said switch device and actuator, permitting the latter to continue its operation while the switch device is locked in said neutral position.

4. The combination with means for supplying charges of molten glass, a switch device comprising spaced troughs or chutes shiftable alternatively into position to receive the charges and direct them to different positions, means for operating the switch, and means to hold the switch in a neutral position in which the glass is discharged between said chutes.

5. The combination with means for supplying charges of molten glass, a switch device comprising spaced troughs or chutes shiftable alternatively into position to receive the charges and direct them to different positions, a lock to hold the switch in a neutral position, a driving element, and a yieldable connection between the switch and driving element, permitting continued operation of the latter while the switch is locked.

6. The combination with means for supplying charges of molten glass, a switch by which the charges are directed alternately to different positions, a driving element, a lock to hold the switch stationary, a yieldable driving connection between the driving element and switch for actuating the latter and permitting the driving element to operate while the switch is locked.

7. The combination with means for supplying charges of molten glass, of transfer mechanism comprising a switch and means actuated by the switch to direct the charges alternately to different positions, a cam, a rod reciprocated by the cam, a connecting device slidably mounted on the rod, and springs on said rod through which power is transmitted to the switch for oscillating it, said springs permitting the rod to reciprocate without actuating the switch when the movement of the latter is obstructed.

8. The combination with means for discharging gobs of molten glass, of transfer mechanism by which the gobs are transmitted alternately to different mold positions, said mechanism comprising a vertical rock shaft, a switch mounted thereon, chutes carried by said switch, means to rock said shaft and thereby bring the chutes alternately into position to receive the gobs, and stationary chutes positioned to register respectively with the chutes on the switch when the latter are in receiving position.

9. The combination of means for discharging gobs of molten glass, and a chute having an approximately vertical surface on which the gobs are dropped, whereby they strike said surface with a glancing blow, said surface below the point at which the glass strikes being curved toward the horizontal to provide an inclined conveying surface for the gobs.

10. The combination with means for discharging molten glass, of a switch device comprising a plurality of means for receiving and directing the glass to different positions, said receiving and directing means being brought individually into operative position by the movement of the switch, automatic means for actuating the switch, a locking device for holding the switch in a neutral position, permitting the glass to be discharged independently of the switch, and means interposed between the switch and its actuating means whereby the latter may continue to operate while the switch is held by the locking device.

11. The combination with means to discharge molten glass, of a device to receive and direct the glass to a point of delivery, automatic mechanism to periodically shift said device into and out of position to deliver the glass, a lock to hold said device out of glass receiving position, and means whereby said shifting mechanism may continue to operate while said device is held by the lock.

12. The combination with means to deliver molten glass, of a chute, automatic mechanism to periodically shift said chute into and out of a position to receive the glass and convey it to a point of discharge, means to hold the chute out of glass receiving position, and a connection between said shifting mechanism and the chute, permitting the operation of said mechanism to continue while the chute is thus held.

Signed by JOSEPH B. GRAHAM at Evansville, in the county of Vanderburg and State of Indiana, this 11th day of April, 1918.

JOSEPH B. GRAHAM.

Signed by RICHARD LA FRANCE at Toledo, in the county of Lucas and State of Ohio, this 9th day of April, 1918.

RICHARD LA FRANCE.